United States Patent [19]

Anetsberger

[11] Patent Number: 5,595,106
[45] Date of Patent: Jan. 21, 1997

[54] BAGEL COOKER

[75] Inventor: Richard J. Anetsberger, Northbrook, Ill.

[73] Assignee: Anetsberger Brothers, Inc., Northbrook, Ill.

[21] Appl. No.: 573,153

[22] Filed: Dec. 15, 1995

[51] Int. Cl.⁶ .................................................. A47J 37/12
[52] U.S. Cl. ................................................ 99/403; 99/415
[58] Field of Search ............................ 99/403, 409, 410, 99/411, 412, 413, 414, 415, 417, 418, 348; 126/373

[56] References Cited

U.S. PATENT DOCUMENTS 3,410,199  11/1968  Ouednau ................................. 99/403
4,787,301  11/1988  Hoatson et al. ......................... 99/403
5,445,062   8/1995  Polster .................................... 99/348

*Primary Examiner*—David Scherbel
*Assistant Examiner*—Reginald L. Alexander
*Attorney, Agent, or Firm*—McCaleb, Lucas & Brugman

[57] ABSTRACT

A compact, bagel-proofing kettle structure of substantially square or rectangular configuration having an open top and a planar bottom over covered by a perforated grid plate operable to promote water turbulence during boiling. The kettle is featured by planar side walls and removeable interior baffles mounted to provide radiused interior corners for the kettle which promotes free, uninterrupted circulation of raw bagels about the kettle's interior during the dough proofing operation without damaging the bagels.

8 Claims, 4 Drawing Sheets

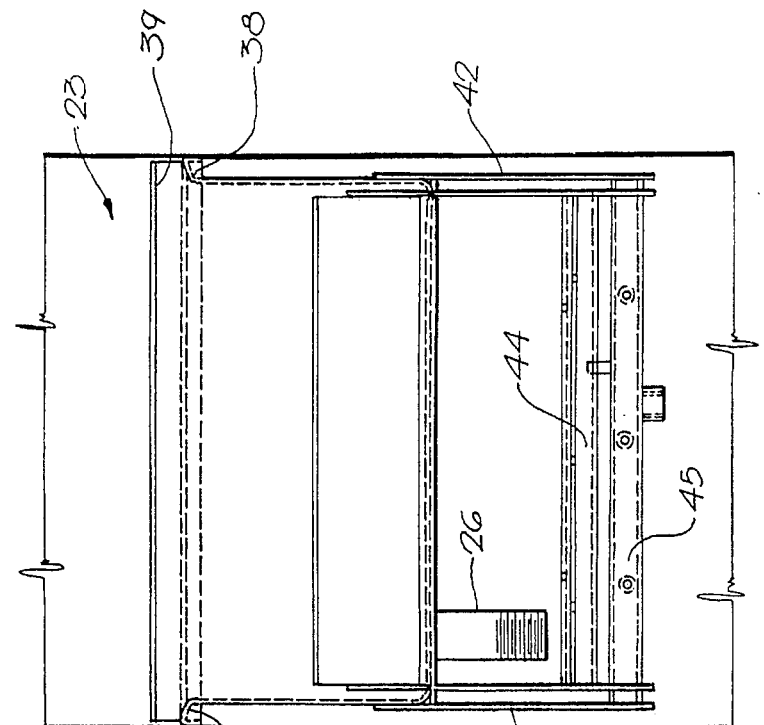
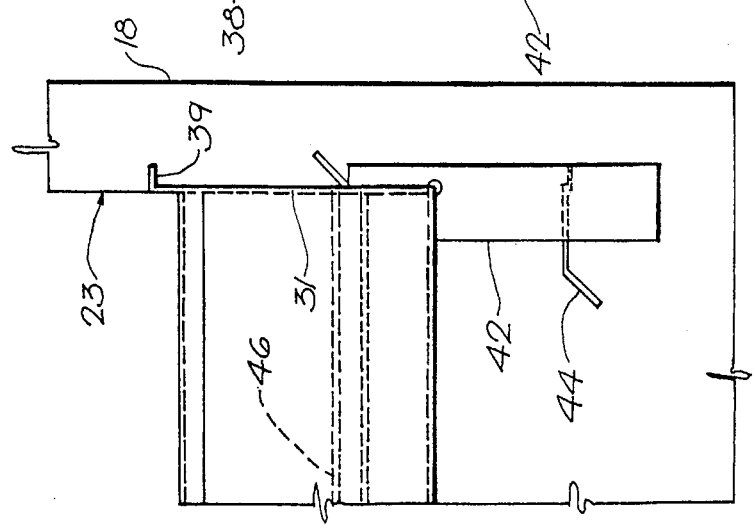
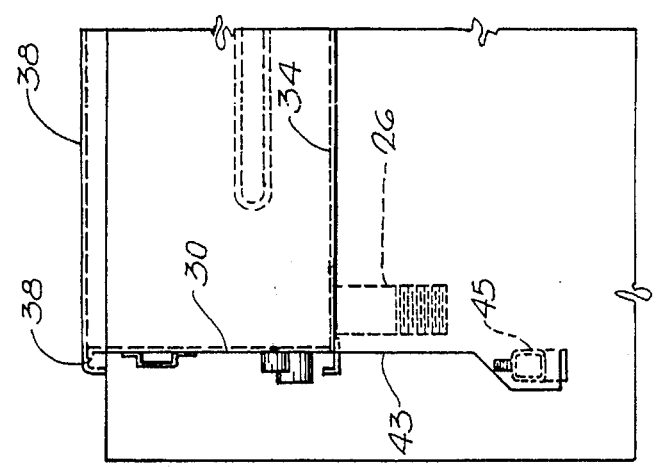
FIG. 7
FIG. 6

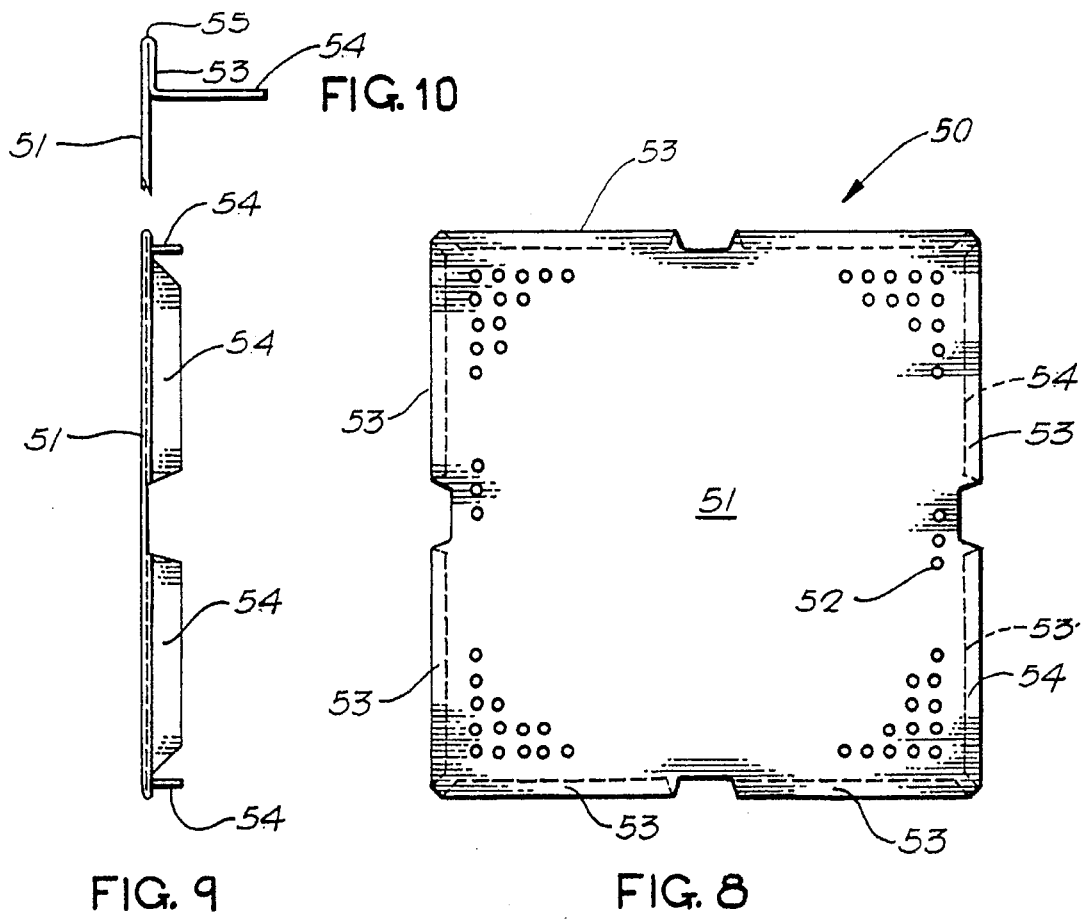
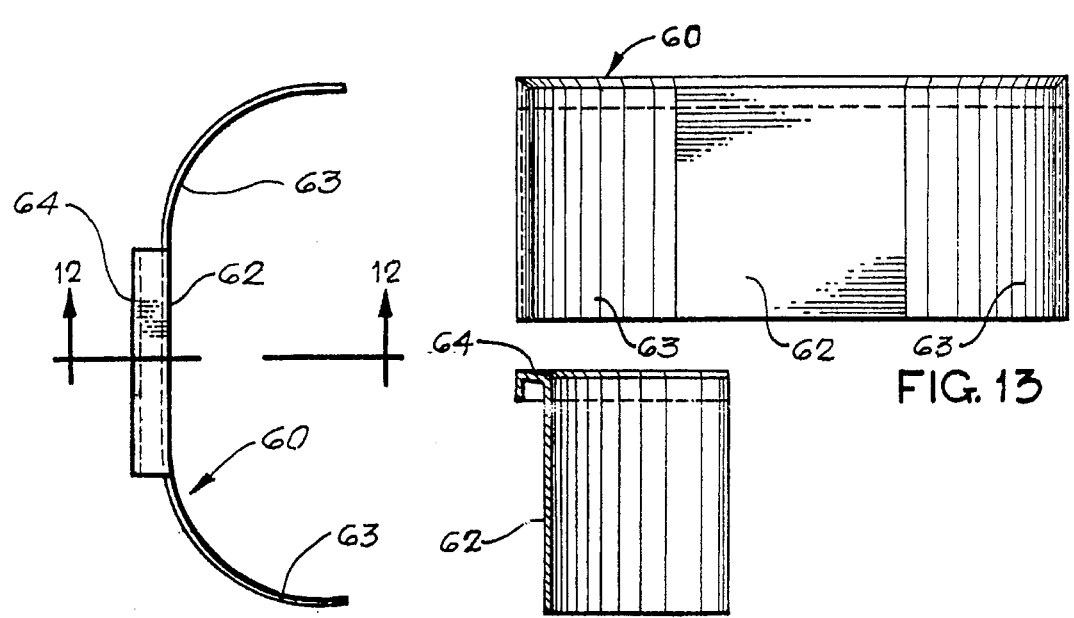

BAGEL COOKER

This invention generally relates to the art of bread making and more specifically to bagel cooking equipment.

BACKGROUND OF THE INVENTION

In the art of cooking fresh bagels, it is recognized practice to "kettle" or "power proof" the fresh bagel dough before oven baking. Traditionally, the procedure is carried out by immersing a number of raw bagels into boiling water contained in a large open top round or semi-spherical kettle. The raw bagels are stirred with a wooden paddle to circulate about the kettle's interior until judged sufficiently proofed whereupon they are removed from the kettle and deposited on trays for oven baking. This operation serves to produce the familiar dense-chewey interior texture while forming an attractive glazed outside crust on the bagel.

Much of the bagel cooking art has been passed from generation to generation while the cooking equipment itself has seen little change over the years. In particular, relatively large traditional round bottom heavy kettles used for the proofing operation are not only difficult to manufacture, but are relatively quite expensive particularly if made according to preferred practice. In general, currently known kettles for proofing bagels are approximately 42 inches in diameter and are capable of handling six dozen raw bagels for each proofing cycle.

Recently the bagel industry has experienced a remarkable period of growth so that both fresh and frozen bagels are available readily in local grocery outlets and supermarkets. In addition the increasing popularity of bagels has given rise to a rapidly expanding number of franchised outlets of relatively modest size. This latter development has created demand for improved, space saving, economical and efficient bagel processing equipment which is compact without diminished operating capacity. It is to this development that the present invention is directed.

SUMMARY OF THE INVENTION

In brief this invention comprises an improved, fabricated sheet metal open top vessel or kettle for proofing bagels; the kettle having a planar, rectangular, horizontal bottom and planar, vertical walls forming right angle interior corners for the vessel. Baffle members are removeably mounted in the vessel's interior to provide radiused or curved interior corners therein, whereby raw bagels may circulate freely in boiling water about the interior of the liquid filled vessel without being jammed in the interior corners of the kettle. A perforated, planar grid plate is mounted over the horizontal bottom of the vessel to promote turbulence of boiling water and thereby accelerating the proofing process.

It is a principal object of this invention to provide improved and simplified bagel proofing equipment.

Another important object of this invention is to provide a kettle for proofing raw bagels which is distinguished by ease and efficiency of operation and maintenance.

Still another important object of this invention is to provide a rectangular bagel proofing kettle structure having removeable interior baffles forming rounded interior kettle corners which materially assists in circulating a batch of raw bagels about the kettle's interior during the proofing process.

Still another object of this invention is to provide an improved bagel proofing kettle, as set out in the preceding object, which has planar sides and bottom walls, is more efficiently heated, uses less water, is compact in design and dimensionally smaller than conventional bagel proofing kettles without sacrificing operational capacity.

Having described this invention, the above and further objects, features and advantages thereof will appear from time to time from the following detailed description of a preferred embodiment illustrated in the accompanying drawings and representing the best mode presently contemplated for practicing this invention.

IN THE DRAWINGS

FIG. 6 is partial foreshortened side elevational view with a side wall broken away to show the arrangement of the kettle and supporting structures;

FIG. 7 is a rear elevational view of the structure set out in FIG. 6 with a rear cabinet wall removed to illustrate the interior arrangement of parts;

FIG. 8 is a top plan view of a rectangular grid plate employed in the bottom of the cooking kettle seen in FIGS. 6 and 7;

FIG. 9 is a side elevational view of the grid plate shown in FIG. 8;

FIG. 10 is a partial, enlarged side elevational view of the margin structure employed in the grid plate of FIGS. 8 and 9;

FIG. 11 is a top plan view of an interior baffle employed with the cooking kettle of FIGS. 6 and 7;

FIG. 12 is a cross sectional view taken substantially along vantage line 12—12 of FIG. 11 looking in the direction of the arrows thereon; and FIG. 13 is a side elevational view of the baffle shown in FIG. 11.

DESCRIPTION OF THE PREFERRED EMBODIMENT

Figure 1:
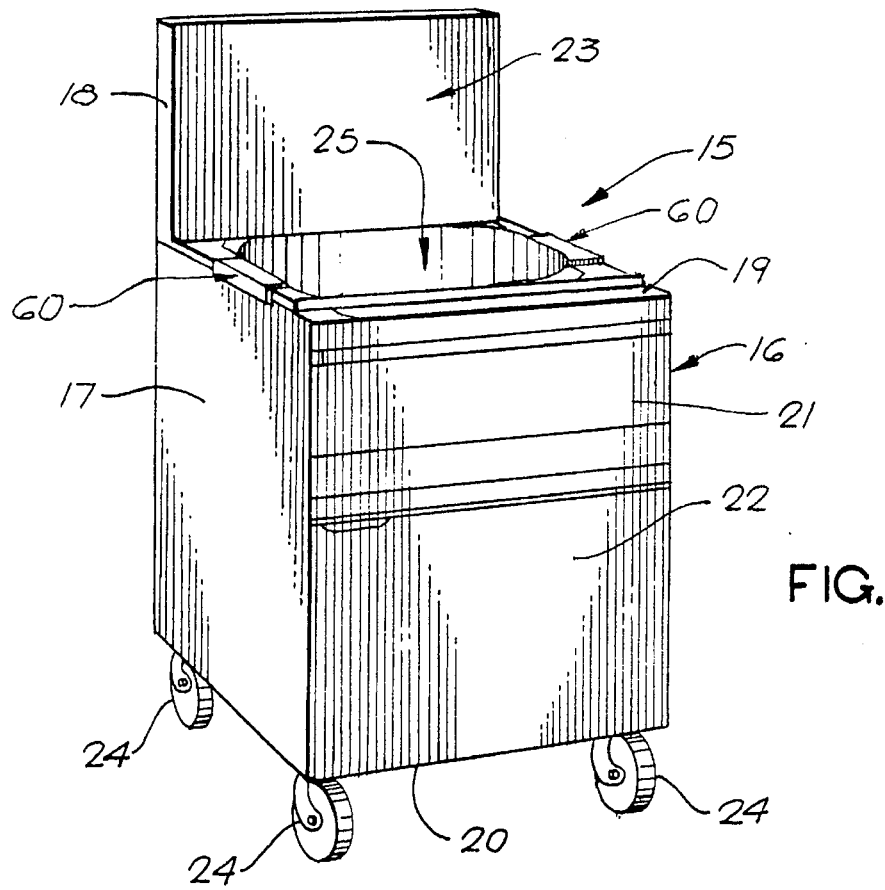
FIG. 1 is a frontal perspective view of a bagel proofing cooker embodying the present invention.
Figure 2:
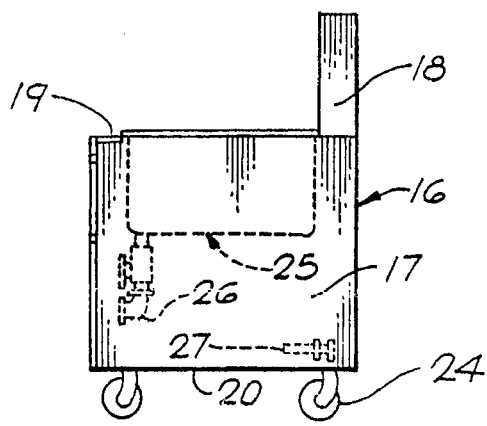
FIG. 2 is a right side elevational view of the cooker illustrated in FIG. 1, but at a reduced scale therefrom.
Figure 3:
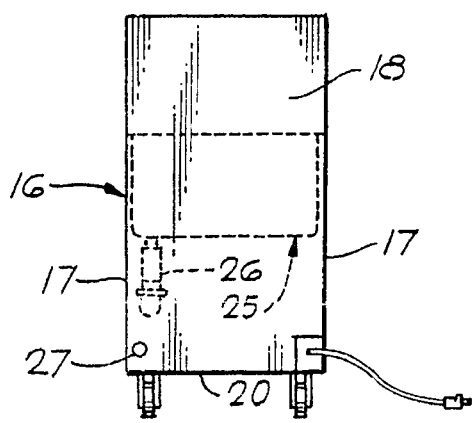
FIG. 3 is a rear elevational view thereof at the same scale as FIG. 2.

With initial reference to FIGS. 1–3 of the drawings, bagel proofing apparatus according to this invention, indicated generally at 15 therein, comprises an upright generally rectangular metal cabinet 16 having parallel, planar side walls 17, a planar back wall 18, top and bottom walls 19 and 20, respectively, and a front panel wall 21 including a hinge mounted access door 22. It will be noted that the back panel 18 extends above the upper end of the cabinet 16 and forms one wall of a back splash structure 23. Cabinet 16, preferably, is supported on wheeled castors 24 located at the bottom four corners of the cabinet so that it may be moved conveniently for cleaning purposes and the like.

Located within the upper interior of cabinet 16 and having an open upper end is a rectangular (in this case square) proofing tank or kettle 25 indicated by dotted lines in FIGS. 2 and 3.

Kettle 25 is equipped with a fast acting valve controlled drain 26 and is supplied feed water from any convenient source. A gas connection 27 connects a gas supply with appropriate burners (not shown), regulated by a thermostat 28 communicating with the water within kettle 25 (see FIG. 5).

As best shown in FIGS. 4–7, kettle 25 has parallel, planar front and back walls 30, 31 intersected by parallel side walls 32 and 33 all integrally related with a planar bottom wall 34. The junction between the walls and the bottom of the kettle preferably is radiused as indicated at 35 in FIGS. 5 and 7.

The kettle has an outwardly folded lip margin 38 forming the upper edges of walls 30, 32 and 33 while the rear wall 31 thereof has its upper edge folded outwardly at right angles to provide a reinforcing flange 39 (see FIG. 6). It will be noted that the rear wall 31 extends above the level of the folded margin 38 and that flange 39 provides a rigid support portion to which the back splash structure 23 is joined.

Under supporting kettle 25 are four vertical leg braces namely, two rear braces 42, 42 and two front braces 43, 43 which are welded to the four exterior corners of the kettle walls along with horizontal under supporting frame work within the cabinet 16, not shown herein. The rear leg braces 42, 42 have a horizontal-gas burner support bracket 44 extending therebetween while a cooperating tubular brace 45 extends between the front leg braces.

Although, not shown herein, appropriate gas fired burners are supported by brace members 44 and 45 to supply heat to the overlying kettle contents in accordance with conventional practice. In the event electrical heating elements are used, such are located within the kettle 25 in direct open contact with the water therein, as indicated by dotted lines at 46 in FIG. 6. Conventional thermostatic control and appropriate ventilation means are provided for the heaters, according to conventional practice.

Figure 4:
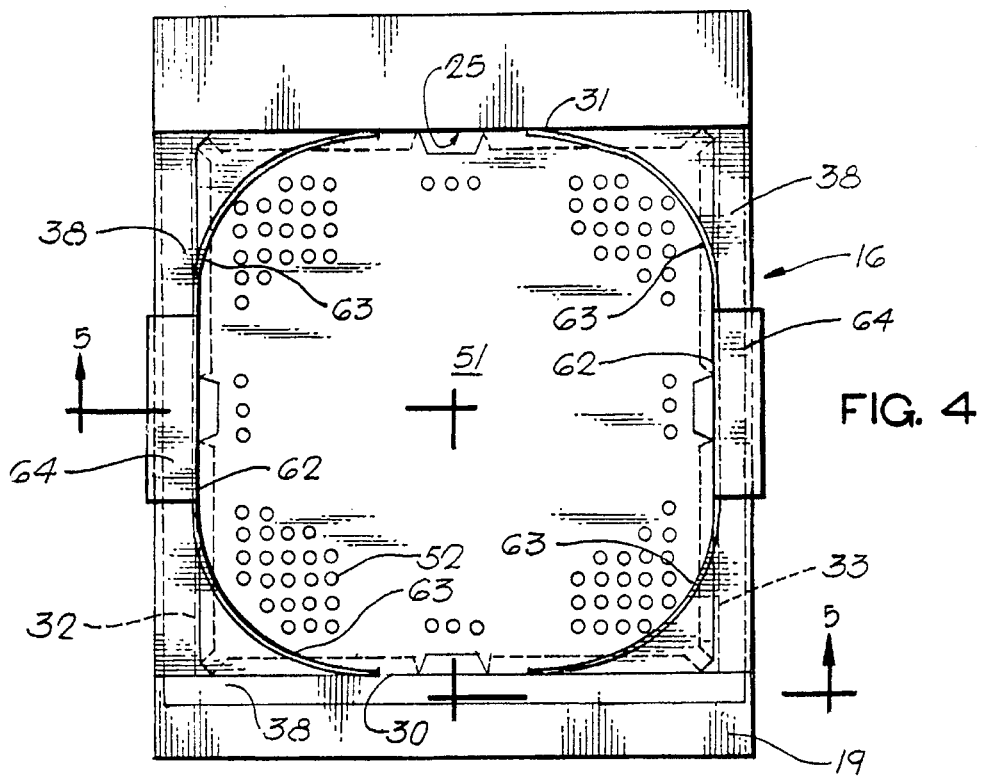
FIG. 4 is an enlarged top plan view of the cooker shown in FIGS. 1–3.

With reference now to FIGS. 4, 5 and 8–10 of the drawings, the features of a perforated grid plate 50 are illustrated. It will be noted from FIGS. 4 and 5 in particular, that the grid plate 50 is removeably superposed in spaced parallel relation over the bottom wall 34 of the kettle 25. As shown in FIGS. 4 and 8, grid plate 50 comprises a planar rectangular body 51 having a plurality of uniformly spaced openings 52 therethrough. The outer marginal portions of body 51 are reintrantly folded over to form double thick border portions 53 which are then bent at right angles to form spaced pairs of vertical support legs 54 depending about the border and beneath the body 51, such being inset slightly from the folded outer edges 55 of the border portions 53.

The provision of the multiple perforated openings or holes 52 in the body of the grid plate provides two valuable functions. First they permit debris, such as corn meal, flour and the like from the raw bagels to settle to the bottom of the kettle beneath the grid plate. Secondly, the holes 52 promote turbulence to the boiling liquid or water contents of the kettle which materially facilitates and accelerates proofing of the raw bagels.

In addition to the grid plate 50, kettle 25 is also fitted with two removeable interior baffles 60, 60, as shown in FIGS. 1 and 11–13 of the drawings.

Figure 5:
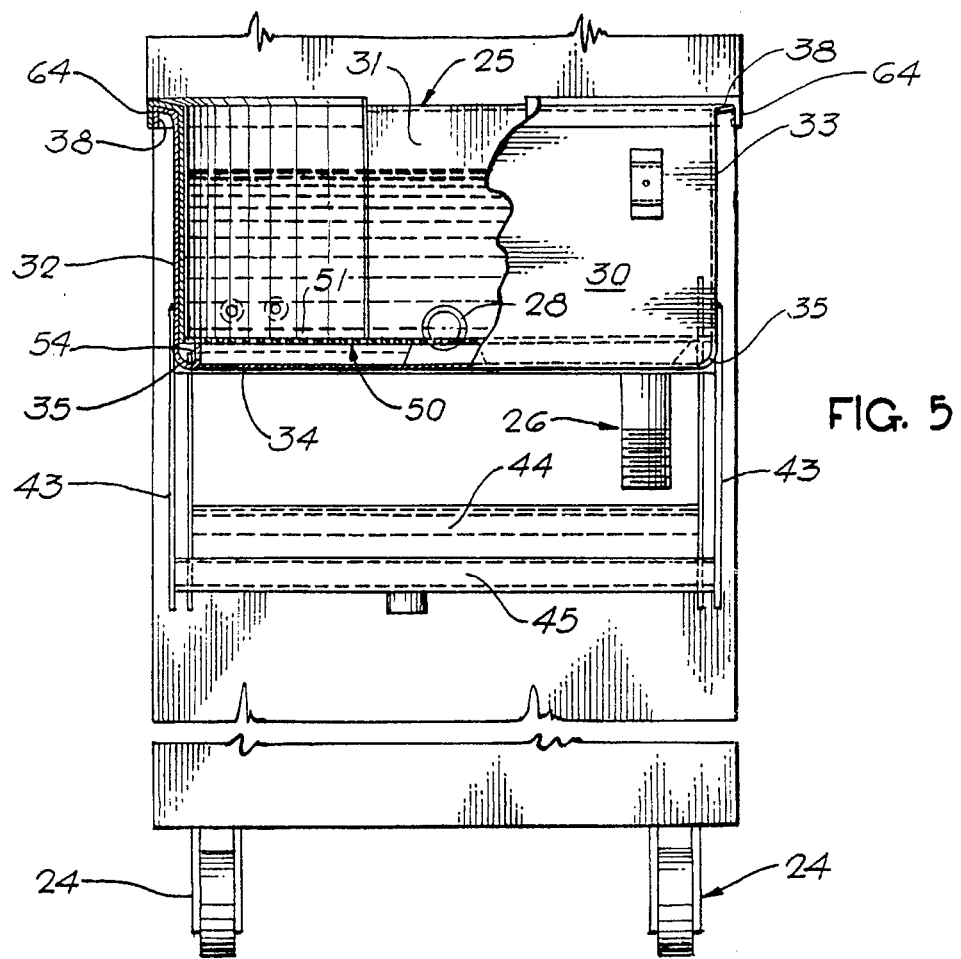
FIG. 5 is a sectional view taken substantially along vantage line 5—5 of FIG. 4 and looking in the direction of the arrows thereon to illustrate the interior arrangement of parts in the bagel cooker of this invention.

As illustrated best in FIGS. 11–13, each baffle 60 comprises a formed skirt wall 61 having a planar central portion 62 and a pair of semi-cylindrical or semi-circular end portions 63 at opposite ends of the central portion 62. The upper end of the central portion 62 is folded outwardly and downwardly to provide a locking flange 64 along the length of central portion 62. The skirt wall extends vertically from the top of the kettle to the upper surface of the installed grid 50 in operation with the down turned peripheral flange 64 locking over the folded margin 38 at the upper end of each of the kettle side walls 32–33, as best shown in FIGS. 4 and 5.

It will be understood that the two baffles are installed on opposite sides of the kettle's interior, so that the curved portions 63 thereof act as curvilinear fillets over the sharp right angular interior corners of the kettle. It is to be noted that the curved portions 63 of the short wall are so formed that the outer free end edges thereof are spaced apart a distance exceeding the spacing between the kettle front and back walls 30 and 31. Consequently, when a baffle 60 is installed with the locking flange 64 overengaged with the side wall margins 38, the curved portions 63 are compressed or sprung toward one another. This causes the baffles 60 to tightly engage the kettle walls 30, 31 to hold the baffles securely in position. The result is an interior kettle wall free of any sharp right angles or corners which could obstruct, damage or otherwise jam the raw bagels as they are circulated about the kettle during the proofing operation.

Ideally since the corner baffles 60, as well as the bottom grid plate 50 are easily removed, such items and the proofing kettle itself may be easily and quickly cleaned and sanitized with minimum effort. It is further to be noted that the planar flat bottom kettle 25 promotes faster heating of the liquid contents and uses less water without loss of production capacity than the familiar and conventionally used round kettles noted heretofore. Consequently, the heat up time for the proofing water is relatively fast with the typical unit according to this invention being capable of heating 18 gallons of water in approximately 28 minutes.

By way of example of the operational capabilities of this compact and novel bagel proofing unit, a kettle according to this invention having the dimensions of 24" by 24" by 12½" deep is capable of containing 18 gallons of water and provides a cooking capacity of approximately 72 bagels for each proofing cycle.

From the foregoing it is believed that those familiar with the art will readily understand and appreciate the novel advancement presented by this invention and will recognize further that while the invention hereof has been described in association with a preferred embodiment thereof illustrated in the accompanying drawings it is nevertheless susceptible to modification, variations and substitution of equivalents without departing from the spirit and scope for the invention which is intended to be unlimited by the foregoing description except as may appear in the following appended claims.

The embodiments of the invention in which an exclusive property or privilege is claimed are defined as follows:

1. Cooking apparatus for proofing raw bagels, comprising:
    an open top bagel proofing kettle comprising a horizontally oriented rectangular bottom having it's periphery integrally joined with four planar vertical walls that are intersectingly integrated at right angles to form corresponding right angular interior corners for said kettle;
    a grid plate having a planar body formed with plural openings therethrough mounted over said bottom; and
    plural baffle means mounted in the interior of said kettle to extend vertically between said grid plate and the kettle's open top comprising semi-cylindrical portions extending over said interior corners whereby to render said corners curvelinear.

2. The cooking apparatus of claim 1, wherein said grid plate is rectangular and has, depending legs adjacent its periphery for operatively maintaining said grid plate in spaced parallelism over said bottom.

3. The cooking apparatus of claim 1, and means for heating a body of liquid contained in said kettle; said grid plate serving to turbulate said liquid when it is heated to a boil whereby to promote proofing of the raw bagels.

4. The cooking apparatus of claim 1, wherein said baffle means and grid plate are removeably mounted in said kettle to promote cleaning of said baffle means and the interior of said kettle.

5. The cooking apparatus of claim 1, wherein said baffle means include means for interlocking the same with upper end margins of opposing said walls of said kettle.

6. The cooking apparatus of claim 1, wherein said baffle means comprise curvilinear portions adapted to extend over the interior corners of said kettle.

7. The apparatus of claim 6, wherein said baffle means comprises two baffles, each having semi-cylindrical portions at opposite ends of a central planar portion comprising said means for interlocking the baffle means with said upper margins.

8. The apparatus of claim 7, wherein said end portions are integral with said central portion and have outer free ends spaced apart a distance greater than the spacing between opposing walls of said kettle whereby said end portions of each baffle are sprung toward each other and tightly engage said opposing walls when mounted in said kettle.

* * * * *